United States Patent [19]

Hartl

[11] Patent Number: 5,364,081
[45] Date of Patent: Nov. 15, 1994

[54] MOTOR VEHICLE SUSPENSION SYSTEM

[75] Inventor: Mathias Hartl, Winnenden, Germany

[73] Assignee: Mercedes-Benz AG, Germany

[21] Appl. No.: 828,223

[22] Filed: Jan. 30, 1992

[30] Foreign Application Priority Data

Jan. 31, 1991 [DE] Germany .............................. 4102787

[51] Int. Cl.$^5$ .............................................. B60G 15/10
[52] U.S. Cl. .................................. 267/64.25; 267/34; 267/113; 280/710
[58] Field of Search ................ 267/217, 218, 221, 222, 267/223, 224, 225; 188/314; 280/708, 710

[56] References Cited

U.S. PATENT DOCUMENTS

| 3,858,902 | 1/1975 | Howells et al. | 267/218 |
| 4,478,431 | 10/1984 | Muller et al. | 280/714 |
| 4,655,440 | 4/1987 | Eckert | 188/314 |
| 4,743,000 | 5/1988 | Karnopp | 188/314 |
| 4,909,534 | 3/1990 | Fukushima et al. | 280/714 |
| 4,936,423 | 6/1990 | Karnopp | 280/714 |
| 4,960,290 | 10/1990 | Bose | 267/221 |
| 5,149,131 | 9/1992 | Sugasawa et al. | 280/707 |
| 5,174,598 | 12/1992 | Sato et al. | 280/707 |

FOREIGN PATENT DOCUMENTS 1430836 12/1968 Germany .

Primary Examiner—Robert J. Oberleitner
Assistant Examiner—Chris Schwartz
Attorney, Agent, or Firm—Evenson, McKeown, Edwards & Lenahan

[57] ABSTRACT

A moved mass of hydraulic medium is used as a compensating mass at critical frequencies of the suspension system to achieve a frequency-selective dynamic damping, and a suitable hydraulic transmission ratio can ensure that a relatively small quantity of hydraulic medium is moved at high speed in order to achieve a good compensating effect, despite the low mass of moved hydraulic medium. A displacement unit can be connected to the sprung mass via an elastic bearing part and to the associated spring accumulator via a hydraulic line. The spring constant of the bearing part, the mass of that part of the displacement unit or of the spring unit mounted on the bearing part, the cross-section of the hydraulic line and its length, the effective cross-section of the displacement unit and the density of the hydraulic medium are so sized that the resonant frequency of the spring unit is near a critical frequency of the suspension system, for example near the frequency of the axle resonance of a vehicle. Alternatively, the displacement unit can be connected to a first spring accumulator which is connected to a second spring accumulator via a hydraulic channel. The length and cross-section of the channel are so coordinated with the density of the hydraulic medium and with the characteristics of the spring accumulators that the natural frequency of vibrations of the fluid mass in the channel coincides at least approximately with one of the critical frequencies of the suspension system.

5 Claims, 2 Drawing Sheets

MOTOR VEHICLE SUSPENSION SYSTEM

BACKGROUND AND SUMMARY OF THE INVENTION

The present invention relates to a motor vehicle suspension system, with hydropneumatic spring units which each consist essentially of a hydraulic displacement unit arranged between a sprung mass, e.g. the vehicle body, and an unsprung mass, e.g. a vehicle axle, and, more particularly to a suspension system with at least one especially pneumatic spring accumulator connected hydraulically to the displacement unit and a compensating arrangement for suppressing critical relative vibrations between the sprung and the unsprung masses.

A suspension system is shown in German Auslegeschrift No. 1,430,836 wherein arranged between the body of the vehicle and its axles or wheels, are respective hydropneumatic spring units which each have a displacement unit configured as a piston/cylinder unit and a hydropneumatic accumulator connected thereto via a throttle and possessing a main gas cushion acting as a spring. A further smaller hydropneumatic accumulator is connected in a non-throttled manner to the displacement unit and possesses an auxiliary gas cushion acting as a spring. In this arrangement, low-frequency vibrations between the sprung and the unsprung mass are damped by the throttle between the displacement unit and the first-mentioned hydropneumatic accumulator. In contrast, vibrations of higher frequency are damped only extremely weakly because the other hydropneumatic accumulator is connected in a non-throttled manner to the displacement unit. In order nevertheless to make it possible effectively to suppress vibrations even of higher frequency, the unsprung mass is coupled to a compensating arrangement rated for these vibrations of higher frequency.

This known arrangement allows for the fact that, with a view to a high degree of comfort, it is basically desirable, in all suspension systems for motor vehicles, to keep the damping of the system, that is to say the friction occurring in the system, as low as possible. However, this is not directly possible because resonant vibrations can occur, specifically, where motor vehicles are concerned, especially a relatively low-frequency body resonance and an axle resonance of comparatively higher frequency. Typical values for the body resonance are around 1 Hz, while the axle resonance occurs at approximately 13 Hz, i.e. a frequency approximately 10 times that of the body resonance.

An object of the present invention is to provide a suspension system which can work with increased damping in critical resonant ranges and which is characterized at the same time by an especially simple construction.

This object has been achieved in accordance with the invention by a suspension system in which parts of the hydraulic medium can be excited as a compensating mass, in relation to the sprung mass, to vibrations whose natural frequency coincides at least approximately with the frequency of the critical relative vibrations.

With a view to an especially effective suppression of critical relative vibrations, the system is so configured that relative movements between the sprung and the unsprung mass lead to comparatively high speeds of movement of the hydraulic medium.

The present invention is based on the general concept of utilizing the moved mass of hydraulic medium as a compensating mass at critical frequencies of the suspension system and thereby achieving a frequency-selective dynamic damping. At the same time, a suitable hydraulic transmission ratio can ensure that a relatively small quantity of hydraulic medium is moved at high speed in order to achieve a good compensating effect, despite the low mass of moved hydraulic medium.

According to a first advantageous embodiment of the present invention, the displacement unit is connected to the sprung mass via an elastic bearing part and to the associated spring accumulator via a hydraulic line, while the spring constant of the bearing part, the mass of that part of the displacement unit or of the spring unit mounted on the bearing part, the cross-section of the hydraulic line and its length, the effective cross-section of the displacement unit and the density of the hydraulic medium are so calculated or coordinated with one another that the resonant frequency of the spring unit is near a critical frequency of the suspension system, for example near the frequency of the axle resonance of a vehicle.

It is a feature of a further preferred embodiment of the present invention that the displacement unit is connected to a first spring accumulator, and the latter is connected to a second spring accumulator via a hydraulic channel. The length and cross-section of the channel are so coordinated with the density of the hydraulic medium and with the characteristics of the spring accumulators that the natural frequency of vibrations of the fluid mass in the channel coincides at least approximately with one of the critical frequencies of the suspension system, again for example the frequency of the axle resonance of a vehicle.

The latter preferred embodiment is characterized by an especially high compensating effect. Moreover, a high freedom of construction is guaranteed in the coordination of the suspension system. It is to be stressed particularly that the elasticity of bearing parts to be arranged, if appropriate, between the sprung mass and the displacement or spring unit can be set largely as desired, so that, for example in motor vehicles, the best possible wheel guidance can be guaranteed.

BRIEF DESCRIPTION OF THE DRAWINGS

These and further objects, features and advantages of the present invention will become more apparent from the following detailed description of presently preferred embodiments when taken in conjunction with the accompanying drawings wherein.

DETAILED DESCRIPTION OF THE DRAWINGS

Figure 1:
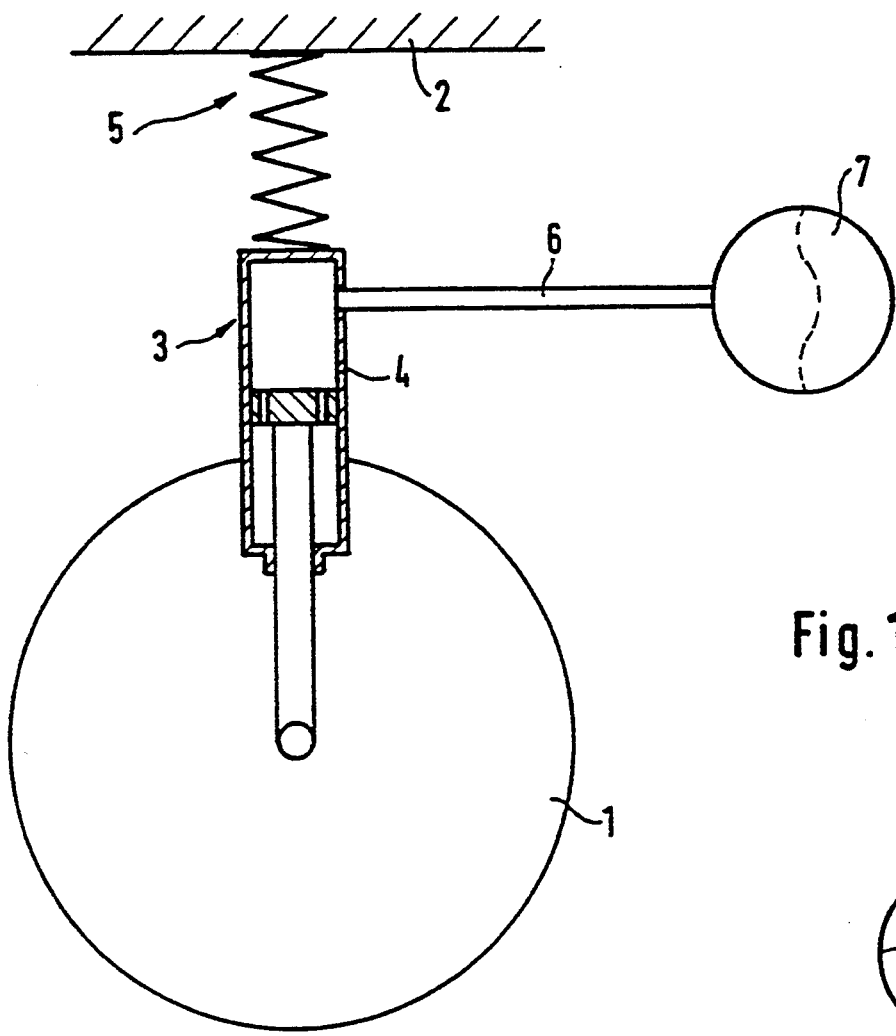
FIG. 1 is a schematic representation of a first embodiment of the suspension system according to the present invention.

Arranged between a vehicle wheel 1 and the vehicle body 2, represented schematically in FIG. 1 and having a mass $m_A$, is a spring strut 3 constructed as a hydraulic displacement unit. The piston of the displacement unit 3 is connected to the wheel 1 or to its axle, and the wheel, piston and axle, etc. constitute an unsprung mass $m_u$.

The cylinder part 4 of the displacement unit 3 receiving the piston working space is connected to the vehicle body 2 via a spring-strut bearing 5, the spring constant of which has the value $c_L$.

The piston working space within the cylinder part 4 is connected via a hydraulic line 6 to a spring accumulator 7 which possesses a conventional pressurized gas filling separated from the hydraulic medium by a diaphragm or the like.

The length of the line 6 has the value l, the cross-section of this line the value $A_L$. This cross-section $A_L$ is usually clearly smaller than the effective cross-section $A_D$ of the piston, in the example illustrated the effective piston cross-section corresponding to the cross-section of the piston rod. The line 6 can be flexible, so that the spring accumulator 7 can be arranged fixed to the body. This is generally expedient when the line 6 is long.

It is also contemplated, however, that the spring accumulator 7 can also be arranged connected fixedly to the cylinder part 4. In this case, the spring accumulator 7 would then increase the mass $m_R$ of the cylinder part 4 correspondingly.

The resonant frequency $\omega_o$ of the system illustrated in FIG. 1 has, with sufficient approximation, the following value:

$$\omega_o = [c_L/(m_R + \rho l A_D^2/A_L)]^{\frac{1}{2}} \qquad (I)$$

By an appropriate calculation or adjustment of the spring constant $c_L$ of the spring-strut bearing 5, the mass $m_R$ of the part of the spring-strut 3 mounted on the spring-strut bearing 5, that is the mass of the cylinder part 4 and of the spring accumulator 7 if appropriate connected firmly to it, the length l of the line 6, the effective cross-section $A_D$ of the piston of the spring strut 3, the cross-section $A_L$ of the line 6 and the density $\rho$ of the hydraulic medium in the spring strut 3 or in the line 6 and in the spring accumulator 7, the resonant frequency of the system illustrated in FIG. 1 can be tuned to a critical frequency of the vehicle, for example the frequency of the axle resonance, in order to damp undesirable vibrations of the axle to an especially pronounced extent. The mass $m_R$ of the cylinder part 4 (and of the parts if appropriate connected firmly to it) and the mass $m_L$ of the hydraulic medium in the line 6 also act as a compensating mass.

The mass $m_L$ of the hydraulic medium in the line 6 can be calculated as $$m_L = \rho l A_L \qquad (II)$$

This mass usually has an especially high compensating effect, because the effective cross-section $A_D$ of the piston of the spring strut 3 is generally substantially larger than the cross-section $A_L$ of the line 6. The actual effect of the mass $m_L$ of the hydraulic medium in the line 6 is proportional to the hydraulic transmission ratio $A_D^2/A_L^2$.

In the embodiment illustrated in FIG. 1, divided off from one another within the cylinder part 4 by the piston of the spring strut 3 are two chambers which are connected to one another by throttle channels passing through the piston. A basic damping of the spring strut 3 can thereby be achieved. It is also possible to do without a basic damping of this kind, if the chambers divided off by the piston in the cylinder part 4 communicate with one another substantially without any throttling effect. Moreover, the piston could, if appropriate, also be constructed in the manner of a plunger, so that there is only a single chamber inside the cylinder part 4. If appropriate, basic damping can also be brought about by arranging a throttle in or on the line 6.

Figure 2:
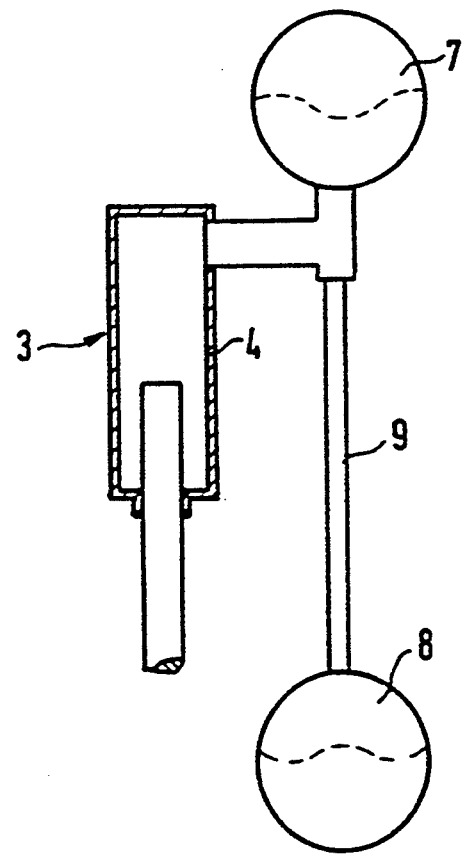
FIG. 2 is a similar schematic representation of a second embodiment of the present invention.

In the embodiment illustrated in FIG. 2, the piston of the spring strut 3 is a plunger, i.e. only a single hydraulic chamber is formed within the cylinder part 4.

The interior of the cylinder part 4 is connected to a first spring accumulator 7, to which a further spring accumulator 8 is connected by a channel 9. This channel has a length $l_K$ and a cross-section $A_K$. The hydraulic medium in the channel 9 can be excited to vibrations in the longitudinal direction of the channel. For the natural frequency $\omega_o$ of these vibrations, the following is obtained (with sufficient approximation):

$$\omega_o = [A_K \cdot (x_7 + x_8)/\rho l_K x_7 x_8]^{\frac{1}{2}} \qquad (III)$$

In this $x_7$ and $x_8$ are the flexibilities of volume of the spring accumulators 7 and 8, respectively. These flexibilities of volume can be calculated as follows:

$$x_7 = p_{07}{}^n V_{07}/n p_s{}^{n+1} \qquad (IV)$$

$$x_8 = p_{08}{}^n V_{08}/n p_s{}^{n+1} \qquad (V)$$

In equations (IV) and (V), n denotes the polytropic exponent of the pneumatic medium in the accumulators 7 and 8, $p_{07}$; $p_{08}$ the filling pressure of the accumulators 7 and 8, $V_{07}$; $V_{08}$ the total volume of the accumulators 7 and 8; and $p_s$ the pneumatic pressure in the accumulator 7 or 8 when the piston of the displacement unit 3 assumes its extended end position.

In the embodiment of FIG. 2, the effective compensating mass is essentially proportional to the product of the mass of the hydraulic medium in channel 9 and the hydraulic transmission ratio $A_D^2/A_K^2$, $A_D$ denoting the effective cross-section of the piston of the displacement unit 3 and $A_K$ the cross-section of the channel 9.

As soon as the piston of the displacement unit 3 executes movements at a frequency in the neighborhood of the abovementioned natural frequency $\omega_o$ of the vibrations of the hydraulic medium in the channel 9, an especially high damping of the piston movements occurs as a result of the spring effect of the vibrating hydraulic medium in the channel 9.

Figure 3:
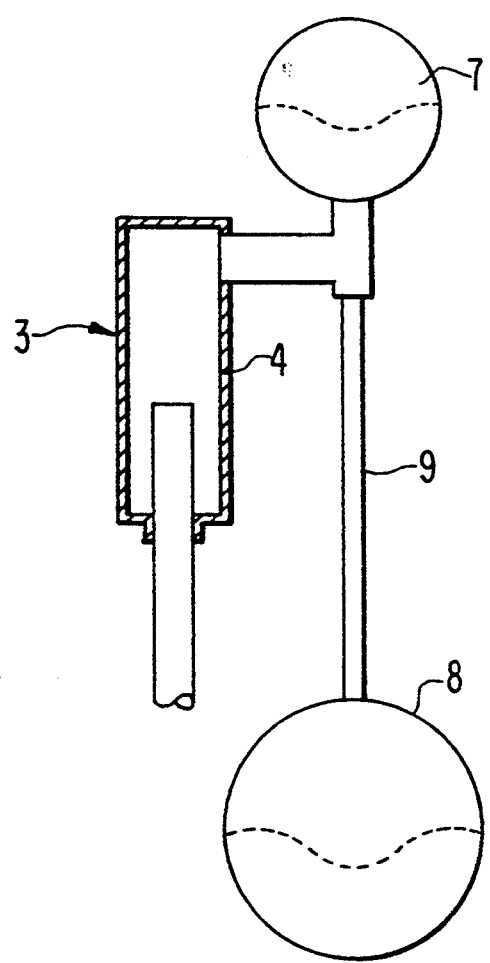
FIG. 3 is a schematic view similar to FIGS. 1 and 2 but showing another embodiment in which the volume of one spring accumulator is clearly larger than another spring accumulator.

The spring accumulators 7 and 8 are usually not of identical configuration. In general, it is expedient if the spring accumulator 8 has a clearly larger volume than the spring accumulator 7 as shown in FIG. 3. Thus, looked at in a simplified manner, the spring characteristic of the spring strut 3 is determined essentially by the spring accumulator 8, while the spring accumulator 7 has primarily, the function of allowing vibrations of the hydraulic medium in the channel 9 so that the compensating effect of these vibrations can be utilized.

In contrast to the embodiment shown in FIG. 2, the piston of the displacement unit 3 can also be configured similar to FIG. 1 such that two chambers communicating with one another via throttle channels are divided off from one another in the cylinder part 4 by the piston. There is thus the possibility of configuring and using the displacement unit 3 in the manner of the conventional hydraulic telescopic shock absorber guaranteeing some basic damping, on which is then superposed the damping obtained as a result of the compensating effect of the mass of the hydraulic medium vibrating in the channel 9.

Additionally or alternatively, it is also possible to provide a throttle arrangement at the junction between the cylinder part 4 and the spring accumulator 7. If appropriate, the throttling effect of the throttle channels or of the throttle arrangement can be controllable in order to allow adaptation to the particular operating conditions. It is thereby possible, for example, in suspension systems for motor vehicles, to counteract body vibrations at a frequency near the body resonance by intensifying the throttling effect of the throttle channels or throttle arrangement, while wheel vibrations at a frequency in the neighborhood of the wheel or axle resonance on account of a corresponding adjustment of the suspension system are damped as a result of the compensating effect of the vibrating mass of the hydraulic medium in the channel 9.

In contrast to the embodiment shown in FIG. 2, two displacement units 3, each assigned a spring accumulator 7, can also be connected in parallel by way of a connecting line, on which is arranged a further spring accumulator 8 common to the two displacement units 3. Here, the respective portions of the connecting line between one of the displacement units 3 and the further spring accumulator 8 each perform the function of the channel 9 in FIG. 2.

It is possible, furthermore, to assign to the displacement unit 3, instead of a single spring accumulator 8 in FIG. 2, two further spring accumulators 8, each of which is connected to the interior of the cylinder part 4 via its own channel 9. By a different adjustment of the channels 9 and of the associated spring accumulators 8, a tuning to two different natural frequencies is then possible, so that damping maximums occur at correspondingly different frequencies as a result of the compensating effect.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A motor vehicle suspension system, comprising a hydropneumatic spring unit configured as a hydraulic displacement unit containing hydraulic fluid operatively between a sprung mass and an unsprung mass, at least one pneumatic spring accumulator operatively connected hydraulically to the hydraulic displacement unit, and a compensating arrangement for suppressing critical relative vibrations between the sprung mass and the unsprung mass such that a portion of the hydraulic medium can be excited, in relation to the sprung mass, by vibrations whose natural frequency coincides at least approximately with a frequency of critical relative vibrations wherein the displacement unit is connected in series to the sprung mass via an elastic bearing part and to the associated spring accumulator via a hydraulic line, and the spring constant ($C_L$) of the bearing part, the mass ($M_R$) of one of the displacement unit and the elastic bearing part, the cross-section ($A_L$) of the hydraulic line, the length (l) of the hydraulic line, the effective cross-section ($A_D$) of the displacement unit and the density ($\rho$) of the hydraulic medium are so selected that the resonant frequency $\omega_0$ is approximately equal to $$[C_L/(m_R+\rho l A_D^2/A_L)]^{\frac{1}{2}}.$$

2. The suspension system according to claim 1, wherein relative movements between the sprung mass and the unsprung mass result in comparatively high speeds of movement of the hydraulic medium.

3. A motor vehicle suspension system, comprising a hydropneumatic spring unit configured as an elastic bearing part and a hydraulic displacement unit containing hydraulic fluid operatively connected in series via the elastic bearing part with a sprung mass and operatively connected with an unsprung mass, and a compensating arrangement for suppressing critical relative vibrations between the sprung mass and the unsprung mass such that a portion of the hydraulic medium can be excited, in relation to the sprung mass, by vibrations whose natural frequency coincides at least approximately with a frequency of critical relative vibrations wherein the displacement unit is connected to a first spring accumulator, and the first spring accumulator is connected to a second spring accumulator via a hydraulic channel, the length and cross-section of the hydraulic channel are so coordinated with the density of the hydraulic medium and the spring characteristics of the spring accumulators that a natural frequency of vibrations of the fluid mass in the channel corresponds at least approximately to a critical frequency, and the cross-section ($A_K$) of the channel, the length (l) of the channel, the spring characteristics ($x_7$, $x_8$) of the spring accumulators, and the density ($\rho$) of the hydraulic medium are so selected that the critical frequency of the suspension system is about:

$$[A_K(x_7+x_8)/\rho l_K x_7 x_8]^{\frac{1}{2}}.$$

4. The suspension system according to claim 3, wherein relative movements between the sprung mass and the unsprung mass result in comparatively high speeds of movement of the hydraulic medium.

5. The suspension system according to claim 3, wherein the second spring accumulator has a larger volume than the first spring accumulator.

* * * * *